Oct. 20, 1942.    O. MALCHER    2,299,586
BALANCING MECHANISM
Filed June 22, 1939
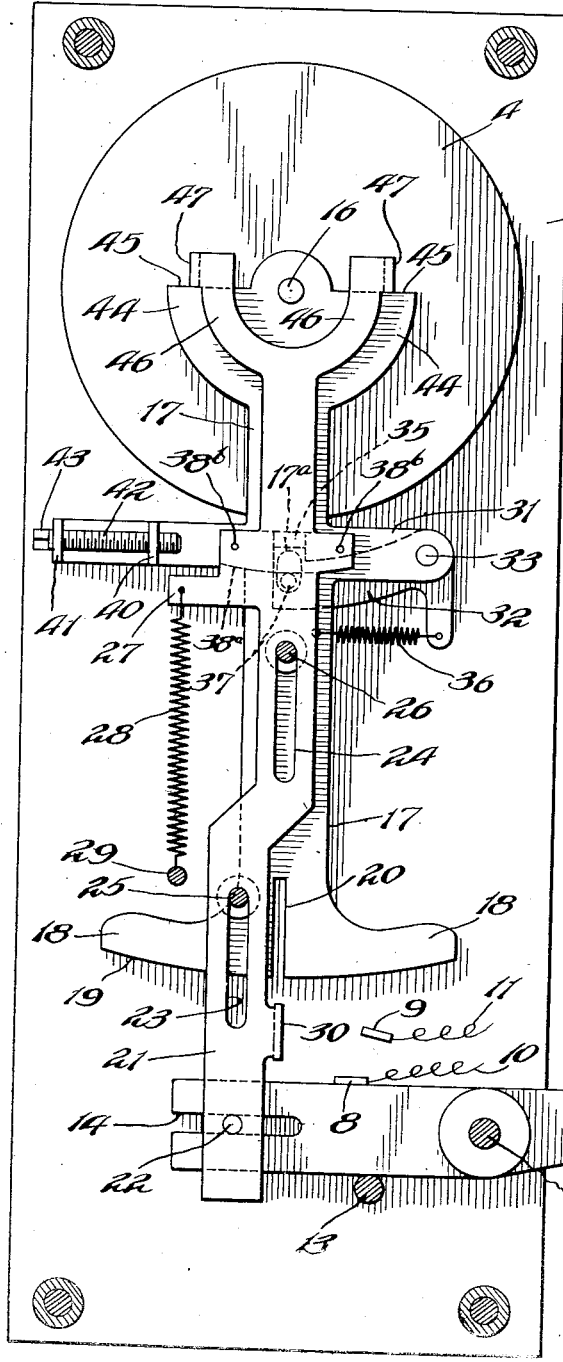
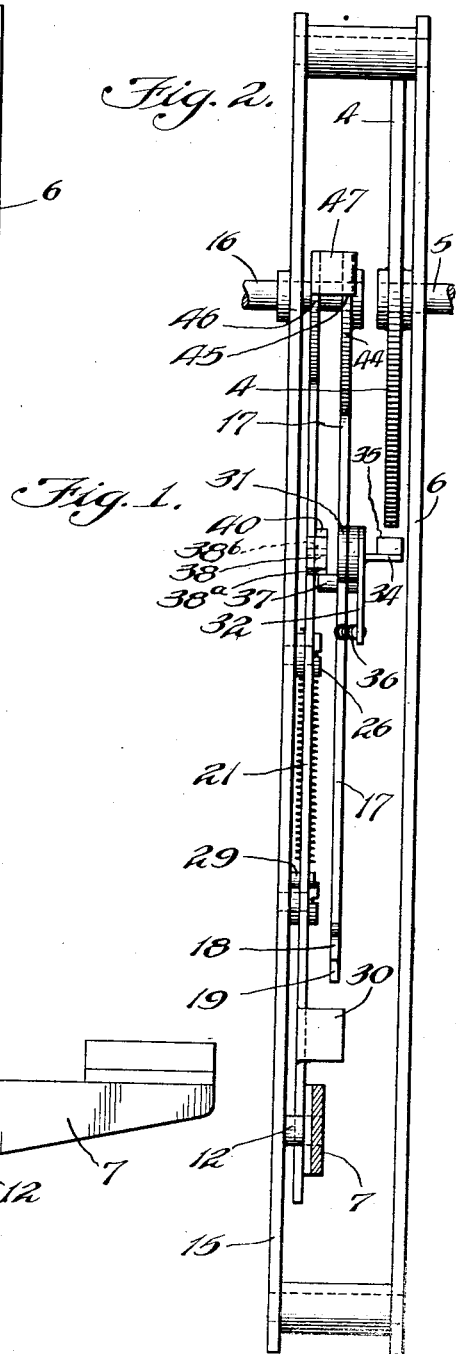
Fig. 2.
Fig. 1.
INVENTOR:
Otto Malcher
BY Kent W. Worrell
ATTORNEY.

Patented Oct. 20, 1942

2,299,586

UNITED STATES PATENT OFFICE 2,299,586

BALANCING MECHANISM

Otto Malcher, Chicago, Ill.

Application June 22, 1939, Serial No. 280,443

12 Claims. (Cl. 265—5)

This invention relates in general to a mechanism which depends for its accuracy of measurement upon a movable part subject to oscillation, and to the prevention of a subsequent operation until the movable part has reached a set or fixed position.

The invention relates to a balancing mechanism as shown for example in my Patent No. 1,815,310, issued July 21, 1931, for a registering scale which automatically prints the weight determined by the scale and to computing scales of the type shown by my application Serial No. 84,151, filed June 8, 1936, in which a calculation is made depending upon the weight and the price per pound after the determination of the weight by the scale mechanism.

As more particularly described in connection with a computing scale, this mechanism prevents operation of the computing machine while the scale is balancing or until it is through balancing, and a similar mechanism may be employed in connection with any succeeding operation which is dependent first upon the balancing of an oscillating member.

An important object of the invention is therefore in the provision of a mechanism which may be built into or applied to a computing scale type of machine for preventing a completion of the value calculation until the scale balancing is complete.

Further objects of the invention are to insure a registering position of the balance mechanism with respect to the mechanism controlling mechanism; to counter-balance and adjust the balancing parts; to provide a yielding retractible brake for the balance; to insure operation of the operating mechanism after the position of the balancing mechanism; and in general to produce the structure herein shown and described.

In the accompanying drawing illustrating a preferred embodiment of the invention, Fig. 1 is an elevation showing the operating parts of the balancing mechanism; and Fig. 2 is a side view partly in section, of the mechanism shown in Fig. 1.

If the calculating mechanism of a computing scale is operated before the scale mechanism has come to a proper and definite stop or while it is balancing, different calculations may be obtained from exactly the same weight, depending upon whether the calculation is completed while the scale mechanism is oscillating, for obviously if one calculation is made at the low side of the oscillation and another calculation is made at the opposite or high side of the oscillation, the resultant calculations may be quite different. The present invention prevents any possibility of variation by insuring that the computation can only be made when the scale is through balancing and this is effected by preventing the operation of the calculating machine until the balancing is complete.

Referring now more particularly to the drawing, a balance disc or wheel 4 is mounted for rotation upon a scale shaft 5 in any suitable machine frame 6 which is represented as connected to any suitable operating part of a weighing machine and rotatable accordingly by a weight placed upon a scale as described in connection with my patent or application Serial No. 84,151 above referred to, the operation being that the wheel or disc 4 rotated or oscillated back and forth when a weight is placed upon the scale beam and continues such oscillation until it comes to rest.

In the operation of a price per pound mechanism as shown in the said application, a hand lever 7 is manually operated to set in motion suitable mechanism or a motor for effecting the price calculation dependent upon the weight and the selected price per pound. In the present application the timed operation of the calculating mechanism is represented by electrical contacts 8 and 9, the former carried by the lever 7 and the other spaced therefrom and these contacts when brought together being represented as closing a circuit between conductors 10 and 11 connected respectively thereto which causes the operation of the calculating mechanism through a motor. The lever itself may be operative to actually operate the calculating mechanism at the time represented by the joining of the contacts 8 and 9, but the specific calculating operation forms no part of the present invention.

The hand lever is mounted upon a pivot 12, is limited in its downward movement by a stop 13 located below the inner end of the lever, and at its inner end is a slot 14 by which it is connected to the balancing mechanism of the present invention.

Mounted for free rotation in a frame part 15 parallel to the frame 6 is a stub shaft 16 substantially coaxial with the scale shaft 5, but separate therefrom. Mounted for free rotation upon the stub shaft or with the stub shaft is a pendular arm 17 having lateral extensions 18 at its lower end with a curved lower surface 19, the curvature being about the axis of the shaft 16. Extending inwardly from the curved surface 19 and centrally of the arm is a slot 20.

A slide 21 having a pin 22 at its lower end engaging in the slot 14 at the end of the hand lever 7 is mounted by means of its slots 23 and 24 upon guide pins 25 and 26 respectively carried by frame part 15 so that when the outer end of the lever 7 is depressed the slide 21 is raised. At the upper end of the slide is an arm or projection 27 to which one end of a spring 28 is connected, the other end of the spring being attached to a stud 29 fixed in the frame 15 so that the spring tends to hold the slide downwardly, seating the pins 25 and 26 at the upper ends of their slots and seating the lever 7 in its rest position against stop 13.

Adjacent the lower end of the slide 21 is an angularly bent projection 30 slightly less in thickness than the slot 20 and adapted to enter the slot when it is in a central or registering position.

Intermediate the ends of the arm 17 and just below the lower edge of the wheel or disc 4 is a laterally extending arm 31 in which a lever 32 is mounted by a pivot 33. One end 34 of the lever carries a frictional contact piece 35 of leather, cork, or the like, at the center of the arm 17 and directly below the lower edge of the wheel or disc 4. The other end of the lever is connected to one end of a spring 36, the other end of the spring being connected to the arm 17 so that the spring tends to press the frictional contact piece in engagement with the periphery of the disc 4.

In order to withhold the brake or contact piece 35 from engagement with the disc the lever 32 is provided directly below the contact piece with a projection 37 extending loosely through an opening 17a in arm 17, and is adapted to be engaged by the lower curved surface 38a of a plate 38 secured at the back of the slide 21 by fastening pins 38b. The slide is normally pulled downwardly by its spring 28 which has more power or resistance than the lever spring 36, the contact piece 35 is withheld from engagement with the disc 4 except when the hand lever 7 is depressed, and at that time the lever 32 is released and pressed against the periphery of the disc 4 by its spring 36 so that if the disc 4 is oscillating, the pendular arm 17 is oscillated with it, being pivoted upon the same axis.

In order to balance the arm 17 because of the lever 32 and its mounting arm 31 at one side of the pendular arm, a projection is provided opposite the arm 31 having threaded ribs or projections 40 and 41 therefrom in which a weight adjusting screw 42 is threaded by means of an angular head 43 at one end thereof. By threading this screw in one direction or the other the weight of the arm 17 can be accurately adjusted and balanced so that when the oscillating wheel 4 is brought to rest the slot 20 of the balancing arm will be accurately centered and opposite the projection 30 which may then be moved into the slot.

At the upper end of the pendular arm 17 are side extensions 44 having upper contact surfaces 45 at opposite sides of the pivoting shaft 16, and at the upper end of the slide 21 is a yoke with extremities 46 having bent extremities 47 adapted to engage and normally resting upon contact surfaces 45. When thus engaged the arm 17 is centered and the pin 37 is engaged by the contact surface of plate 38 holding the frictional contact piece 35 out of engagement with balance wheel 4.

In operation, when the outer end of hand lever 7 is depressed, slide 21 is partially raised, first freeing the arm 17 from the centering engagement of the yoke extremities 47, then releasing the pin 37 from engagement with plate 38, and allowing contact piece 35 to resiliently engage the periphery of balance wheel 4 due to spring 36. This engagement causes the arm 17 which is now free, to swing in unison with the wheel, thus engaging and retarding the swinging action of the arm 17 in either direction and bringing it more quickly to a stop in its balanced position. The operator, noting that the hand lever 7 cannot be depressed, relieves pressure thereon, and allows the slide 21 to be returned by its spring 28, which frees the wheel 4, allowing it to come to rest, and centers the pendular arm 17 by the resilient engagement of yoke extremity 47 with the surfaces 45. At this time, if the balance wheel 4 is at rest the projection 30 can be inserted in slot 20 and the subsequent operation of the mechanism completed.

The operator finds that he cannot depress the hand lever 7 until the balance wheel stops oscillating, and that release of the lever tends to hasten the retarding or stopping the movement of the wheel, and that the hand lever can be fully depressed in a short time.

The location of the contacts 8 and 9 for controlling the subsequent operation of the mechanism is such that they are not joined until after the projection 30 enters the slot 20, thus insuring that the scale or balancing means is brought accurately to a central position after the balancing is complete before the hand lever can complete its operating movement. Actually, and in practice, the balancing movement including the oscillation, the engagement of the contact member 35, the rocking of the arm 17 with the wheel 4 occupies a very short time, simply delaying the movement of the hand lever 7 until the balancing is complete, whereupon the slide 21 will move its projection 30 into the slot and allow the engagement of the circuit closing contacts 8 and 9. This starts the calculating mechanism, the hand is removed from the lever 7, the spring 28 returns the slide 21, the yoke centers the arm 17, plate 38 engages pin 37 and retracts the lever 32 and its contact 35, the projection 30 is withdrawn from the slot 20, and the slide 21 and the lever 7 are returned to their original and normal positions.

While this mechanism is particularly applicable to the computing scale type of machines as above set forth, it is obvious that it is also applicable to any oscillating or balancing part where the subsequent operation is dependent upon the accurate centering or positioning of the oscillating or movable part.

I claim:

1. The combination with a balancing wheel, of mechanism dependent for operation upon the balanced position of the wheel, and means allowing operation of said mechanism only when said wheel is through balancing, said means comprising an arm rotatable about an axis in common with said wheel having a slot at the free end of the arm, an operating lever for said mechanism, and means comprising a slide actuated by said lever for connecting the arm with said wheel and having a projection to engage the said slot only when the wheel is balanced.

2. An operation preventive mechanism according to claim 1, in which the arm has a lever pivoted thereon with a contact member for engaging the wheel, and the slide has an extension engaging the said lever on the arm to allow the contact member to engage the wheel when the slide is moved by its lever.

3. An operation preventive mechanism according to claim 1, in which a spring-pressed lever having a contact for engaging said wheel is pivoted on the arm, and the slide has a spring tending to return it and its operating lever to inoperative position, the slide engaging the arm lever and the slide spring being stronger than the spring of the arm lever, the arm lever contact being moved by its spring to engage the wheel when the slide is moved in one direction by its operating lever and the slide spring overcoming the lever spring and withdrawing the arm lever contact from engagement with the wheel in the other direction.

4. The combination with a balancing oscillatable part, of an arm to swing freely upon an axis common to said part and extending beyond the edge of said part with a slot in the remote edge of the arm, a lever pivoted on the arm having a contact portion to engage said part, an adjustable counter-balance for said lever mounted on the arm, and means dependent for operation upon the balanced position of said oscillatable part, including a movable member to engage in the slot only in a centered position thereof.

5. The combination with an oscillatable part, of a pendant arm free upon an axis common to the part extending beyond the edge of the part and having a contact surface at its free end curved about said axis with a transverse central slot, a spring-pressed lever pivoted on the arm having a contact piece to engage said part to move the arm therewith, a slide having a lever to move it in one direction and a spring to move the slide and lever in the other direction and the lever against a fixed stop, the slide having an extension at its upper end to engage and release the arm lever for engagement with said part and having a projection at its lower end to contact said curved surface and to enter the slot therein when the arm and part are balanced and centered, and the slide lever having actuating means engaged thereby only after the slide projection has entered the central slot.

6. In a computing scale, a rotatable scale balance wheel, a pendant arm freely rotatable upon an axis common to that of the wheel and extending beyond the edge of the wheel with an outer edge curved about the same axis and a central radial slot therein, means to connect the arm to engage and balance with said wheel, a slide for controlling said means having a projection to engage said curved edge and to enter the slot when the arm is at rest in central position, and a controlling lever for the computing means operative to move the slide and having an operative connection for the computing means which is completed only after the scale wheel is balanced and when the slide projection enters the said slot.

7. The combination with a rotatably movable balancing part, of mechanism having actuating means and dependent for its operation upon the balanced position of said part, said mechanism comprising a rotatable arm having contact means to engage said part for rotation therewith, and a spring-pressed slide movable by said actuating means against said spring, the slide having a projection to engage the contact means and hold it out of contact with said balancing part by the spring, the operation of the actuating means overcoming the spring pressure and freeing the contact means, and a registering connection between the slide and arm to insure a predetermined position of the arm before the slide can be fully operated by the actuating means.

8. A balance insuring mechanism in accordance with claim 7 in which the slide has contact projections at its upper end and the arm has contact surfaces adapted to be engaged by the projections when the slide is pressed down by its spring, thereby positioning the arm for a registering connection between the arm and slide.

9. A balance insuring mechanism in accordance with claim 7 in which the arm is pivoted at its upper end and has projecting contact surfaces at each side of the pivot, the slide having projections at its upper end to engage the surfaces and pressed in engagement with the surfaces by its spring when pressure is relieved on the slide actuating means.

10. A structure in accordance with claim 7 in which the arm is pivoted at its upper end and the slide has a contact yoke at its upper end to overlie and engage the arm at opposite sides of its pivot, the relation being that the slide is first actuated to release the contact means of the arm, the contact means engages the balancing part and moves the arm if said part is not balanced, preventing further and complete movement of the slide until it registers with the predetermined position of the arm, the contact yoke returning the arm to its predetermined position after each release of the slide actuating means, and the complete movement of the slide by its actuating means being possible only when the balancing part is at rest.

11. In a computing scale, a rotatable scale balance wheel, a pendant arm freely rotatable upon an axis common to that of the wheel and extending beyond the edge of the wheel with an outer edge curved about the same axis and a central radial slot therein, means to connect the arm to engage and balance with said wheel, a slide for controlling said means having a projection to engage said curved edge and to enter the slot when the arm is at rest in central position, and a controlling lever for the computing means operative to move the slide and having an operative connection for the computing means which is completed only after the scale wheel is balanced and when the slide projection enters the said slot.

12. The combination with a balancing scale part, of mechanism dependent for operation upon the balanced position of the part, and mechanical means for periodically connecting the mechanism and said part requiring a delay in the operation of the mechanism until the scale part is balanced, said means comprising an arm free to swing adjacent the balancing scale part and having an outer projecting edge with a radial slot in the edge, means to transmit the movement of the scale part in balancing periodically to the said arm, and means for operating said mechanism comprising a movable slide having a projection to enter said slot, said means to periodically transmit movement of the scale part to said arm being actuated in response to the initial movement of said slide, but the projection engaging the edge to prevent actuating movement of the slide except when the scale part is balanced and the projection of the slide registers with the radial slot.

OTTO MALCHER.